(12) United States Patent
Morena et al.

(10) Patent No.: US 8,252,708 B2
(45) Date of Patent: Aug. 28, 2012

(54) CRYSTALLIZATION-FREE GLASS FRIT COMPOSITIONS AND FRITS MADE THEREFROM FOR MICROREACTOR DEVICES

(75) Inventors: Robert Michael Morena, Lindley, NY (US); Paulo Jorge Marques, Fontainebleau (FR); Henry Edwin Hagy, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/415,286

(22) Filed: Mar. 8, 2012

(65) Prior Publication Data

US 2012/0172191 A1    Jul. 5, 2012

Related U.S. Application Data

(62) Division of application No. 12/692,662, filed on Jan. 25, 2010, now abandoned, which is a division of application No. 11/594,657, filed on Nov. 8, 2006, now abandoned.

(30) Foreign Application Priority Data

Nov. 30, 2006 (EP) .................................. 05292534

(51) Int. Cl.
*C03C 3/118* (2006.01)
*C03C 8/06* (2006.01)

(52) U.S. Cl. ................. 501/59; 501/27; 501/25; 501/57; 501/66

(58) Field of Classification Search .................... 501/25, 501/27, 57, 59, 66
See application file for complete search history.

(56) References Cited

U.S. PATENT DOCUMENTS

| | | |
|---|---|---|
| 2,319,816 A | 5/1943 | Land |
| 3,499,776 A | 7/1966 | Baak et al. |
| 3,540,793 A | 11/1970 | Araujo |
| 3,653,863 A | 4/1972 | Araujo et al. |
| 3,873,329 A | 3/1975 | Beall |
| 3,954,485 A | 5/1976 | Seward, III et al. |
| 4,017,318 A | 4/1977 | Pierson et al. |
| 4,057,408 A | 11/1977 | Pierson et al. |
| 4,118,214 A | 10/1978 | Wedding |
| 4,125,404 A | 11/1978 | Araujo et al. |
| 4,125,405 A | 11/1978 | Araujo et al. |
| 4,134,747 A | 1/1979 | Pierson et al. |
| 4,226,628 A | 10/1980 | Bartholomew et al. |
| 4,282,022 A | 8/1981 | Lo et al. |
| 4,304,584 A | 12/1981 | Borrelli et al. |
| 4,315,991 A | 2/1982 | Hagy et al. |
| 4,726,981 A | 2/1988 | Pierson et al. |
| 4,814,297 A | 3/1989 | Beall et al. |
| 4,979,975 A | 12/1990 | Borrelli et al. |
| 4,980,318 A | 12/1990 | Araujo |
| 5,057,018 A | 10/1991 | Bowen |
| 5,071,793 A | 12/1991 | Jean et al. |
| 5,374,595 A | 12/1994 | Dumbaugh, Jr. et al. |
| 5,413,971 A | 5/1995 | McPherson |
| 5,430,573 A | 7/1995 | Araujo et al. |
| 5,517,356 A | 5/1996 | Araujo et al. |
| 5,625,427 A | 4/1997 | Araujo et al. |
| 5,627,114 A | 5/1997 | Havens et al. |
| 5,729,381 A | 3/1998 | Havens et al. |
| 5,747,395 A | 5/1998 | Smith et al. |
| 5,747,399 A | 5/1998 | Kosokabe et al. |
| 5,853,446 A | 12/1998 | Carre et al. |
| 6,221,480 B1 | 4/2001 | Borrelli et al. |
| 6,298,691 B1 | 10/2001 | Borrelli et al. |
| 6,444,076 B1 | 9/2002 | Herndon et al. |
| 6,461,734 B1 | 10/2002 | Carre |
| 6,466,297 B1 | 10/2002 | Goulding et al. |
| 6,536,236 B2 | 3/2003 | Grossman et al. |
| 6,563,639 B1 | 5/2003 | Borrelli et al. |
| 6,599,736 B2 | 7/2003 | McCaskill et al. |
| 6,635,592 B1 | 10/2003 | Kosokabe et al. |
| 6,775,062 B2 | 8/2004 | Borrelli et al. |
| 2004/0152580 A1 | 8/2004 | Marques |
| 2004/0206391 A1 | 10/2004 | Guzman et al. |
| 2005/0128588 A1 | 6/2005 | Borrelli et al. |

FOREIGN PATENT DOCUMENTS

| | | |
|---|---|---|
| DE | 10337362 A1 | 3/2004 |
| EP | 0297255 A2 | 5/1988 |
| EP | 0947246 A1 | 6/1999 |
| EP | 0999459 A2 | 10/2000 |
| EP | 1426345 A1 | 12/2002 |
| WO | 99/40038 A1 | 8/1999 |

OTHER PUBLICATIONS

"Selective polarization of light due to absorption by small elongated silver particles in glass," S. D. Stookey et al., Applied Optics, May 1968, vol. 7, No. 5, pp. 777-779.
"A scalable silicon microreactor for preferential CO oxidation: performance comparison with a tubular packed-bed microreactor," Applied Catalysis A: General 274 (2004) 285-293.
"AMLCD glass substrates—foundation for high-tech displays," Bocko, et al., The Glass Researcher, vol. 12, No. 1 and No. 2, pp. 26-29, 2002 NSF Industry University Center for Glass Research.
Handbook of Ceramic Grinding and Polishing, eds. I.M. Marinescu et al., Noyes Publications, Park Ridge, NJ, pp. 374-389 (2000). H.E. Hagy, "A review and recent developments of photoelastic techniques for the measurement of thermal expansion differentials using glass seals," Proceeding of the Thirteenth International Thermal Expansion Symposium, Technomic Publishing Co., pp. 279-290 (1999).
ASTM Designation F140-98, "Standard practice for making reference glass-metal butt seals and testing for expansion characteristics by polametric methods," Annual Book of ASTM Standards 2002, vol. 15.02, pp. 514-519.

*Primary Examiner* — Karl Group
*Assistant Examiner* — Elizabeth A Bolden
(74) *Attorney, Agent, or Firm* — Walter M. Douglas

(57) ABSTRACT

A borosilicate glass composition suitable for manufacturing microreactor glass frits includes 12-22 mol % $B_2O_3$=12-22; 68-80 mol % $SiO_2$; 3-8 mol % $Al_2O_3$, 1-8 mol % $Li_2O$, and one of 0.5±0.1 mol % $ZrO_2$ and 1.1±0.5 mol % F. After sintering a glass frit having the borosilicate glass composition, the glass frit has a surface crystalline layer of 30 μm or less or is amorphous throughout.

6 Claims, 7 Drawing Sheets

US 8,252,708 B2

CRYSTALLIZATION-FREE GLASS FRIT COMPOSITIONS AND FRITS MADE THEREFROM FOR MICROREACTOR DEVICES

CROSS-REFERENCE TO RELATED APPLICATIONS

This application is a divisional of U.S. patent application Ser. No. 12/692,662 filed on Jan. 25, 2010 now abandoned, which is a divisional of U.S. patent application Ser. No. 11/594,657, filed Nov. 8, 2006 now abandoned, which claims the benefit of priority under 35 U.S.C. §119 of European Patent Application No.: 05292534.4, filed on Nov. 30, 2005, the content of which is relied upon and incorporated herein by reference in its entirety, and the benefit of priority under 35 U.S.C. §120 is hereby claimed.

FIELD OF INVENTION

The invention is directed to crystallization-free glass fits that are suitable for the manufacturing of glass microreactor using micro-molding technology and to the glass compositions used to make such fits; and in particular to glass fits that exhibit resistance to thermal shock and have excellent chemical durability

BACKGROUND

As a result of economic forces, environmental considerations, waste disposal regulations and other factors, activities in the fields of thermal and chemical process engineering have gravitated toward the use of microreactors for research and development, including modeling studies and chemical reactions. In addition, microreactors are finding application in pharmaceutical and biological research, development and analysis. A microreactor is a device that enables chemical reactions, either gaseous or liquid, to be done on the low milliliter scale (510 ml) as opposed to earlier laboratory "bench top" or pilot plant scales that varied in size from many tens of milliliters to liters in the former and up to a hundred liters, or more, in the latter. The microreactor is generally a continuous flow reactor that brings the reaction components together in a small reactor channel. FIG. 1 is a top view illustrating one of the simplest designs, a "T-shaped" microreactor 10. In a typical reactor of this design a T-shape is etched into a plate 20 to a selected depth (for example, 50 µm deep by 100 µm wide) and the etched plate is then covered with another plate (14 in FIG. 2) so that the etched portion forms an enclosed channel. The cover plate has openings (three illustrated in FIG. 1) so that fluids (gaseous or liquid) can be added and removed from the reactor. A reaction is be carried out by pumping a first fluid containing a first reactant through opening 22 and a second fluid containing a second reactant through opening 24. The fluids are pumped at the same rate so that they meet at the position 26, the top of the vertical part 28 of the T where they begin to mix and react as they proceed (illustrated by the broad arrow 27) down the vertical part 28 of the T. The reaction product is removed at the opening 30. FIG. 2 is a side view illustrating etched plate 20, top plate 14, openings 22, 24 and 30, and fluid illustrated as light grey in the reactor. The dashed line 16 illustrates the junction of placed 14 and 20.

While the simple design illustrated in FIG. 1 is satisfactory for some reactions, for others a more complex design is required. For example, it may be desirous to add mixing baffles; openings for the further addition of reactants as the fluids travel from the beginning to the end of the reactor; space for heating and/or cooling elements with their associated connections; thermocouples and their connections; and other elements as may be need to carry out, control or monitor the reactions that occur within the microreactor. As a result the design of the reactor can become quite complicated; which in turn means that the construction of the reactor itself becomes complicated and expensive if etching techniques are used to construct parts of the microreactor. In addition, while materials such as metals, silicon and certain polymers can be used to fabricate microreactors, these materials are not well suited for chemical reactions at high temperature and/or that use corrosive reactants. As a result of the foregoing problems, a simplified method for making microreactors is desirous; and it is further desired that such reactors be made of glass or ceramic materials due to their high thermal stability and their chemical durability and/or inertness to the vast majority of chemicals and solvents.

As a result of the foregoing problems, methods of making microreactors using "frits", particularly glass fits, have been developed. A frit is a powdered glass that sinters to form a structure that incorporates, for example, microreactor features and/or elements. To make the microreactor the fit is typically sandwiched between two substrate layers that may themselves incorporate some microreactor elements such as the openings for reactant(s) entry and exit, control leads for heaters and other elements, some of which have been described above. The resulting "sandwiched" microreactor must be "fluid tight" so that reactants and/or solvents do not escape. Commonly owned U.S. Patent Application Publication No. 2004/0152580 A1 (assigned to Corning Incorporated) describes borosilicate glass compositions and their use to make microfluidic devices such as the microreactors described above. As mentioned in U.S. 2004/0152580 A1, the problem with PYREX® glass flits is that they undergo devitrification (that is, crystals of different materials are formed) during sintering at temperatures in the range of 700-800° C. However, there is a lowering of mechanical strength due to both the formation of crystals with a high coefficient of thermal expansion and the volume change that is associated with the phase transformation of cristobalite crystals at approximately 200° C. This can lead to frit cracking on cooling after sintering. As a result, the inventors in U.S. 2004/0152580 A1 proposed that alumina be added to the borosilicate glass composition. The addition of alumina causes the sintering ability of the fit to decrease and reduces the fluidity of the fit. While the materials describes in U.S. 2004/0152580 A1 resulted in an improved fit material, further improvements are needed to both frit compositions and to the method of making fits that can be used in microreactors. The present invention is directed to improved compositions that can be used to make glass flits that can be used in microreactor and the methods of making such flits.

SUMMARY

The invention is directed to glass compositions having a low softening point low CTE, high acid and alkali chemical resistance, and high crystallization resistance that are suitable for manufacturing glass flits for microreactors. The glasses of the invention are borosilicate glasses containing either (a) lithium oxide plus aluminum oxide or (b) sodium oxide or potassium oxide. The glasses of the invention have a crystallized depth layer, as measured by the HTS method described herein using bulk glass, of less than 30 µm, preferably less than 20 µm, and most preferable 10 µm or less. The substrates used in practicing the invention can have a CTE in the range of 25-40×10$^7$/°C., preferably in the range of 30 to 40×10$^7$/°C.

The invention is further directed to borosilicate glasses and glass frits having a base composition in mole percent (mol %) of $B_2O_3$=12-22 mol %
$SiO_2$=68-80 mol %; and and as additional substances selected from the groups of either:

(a) $Al_2O_3$=3-8 mol % and $Li_2O$=1-8 mol %, or
(b) $K_2O$=0-2 mol % and $Na_2O$=0-2 mol %, except that both $K_2O$ and $Na_2O$ cannot both equal zero at the same time.

In addition, one or more of calcium oxide (CaO) in an amount of 1.0-1.4 mol %, zirconium oxide ($ZrO_2$) in an amount of 0.5±0.1 mol %, fluorine (F) in an amount less than 1.5 mol %, and sodium oxide ($Na_2O$) in an amount less than 3 mol % can optionally be added to combination of the a glass of the base composition and (a) as above.

The invention is also directed to borosilicate glasses and glass frits having a composition in mole percent (mol %) of $B_2O_3$=18-22 mol %, $SiO_2$=75-80 mol %, $K_2O$=0-2 mol %, and $Na_2O$=0-2 mol %, except that both $K_2O$ and $Na_2O$ cannot both equal zero at the same time.

Additionally, the invention is directed to glasses, and frits made therefrom, having the following compositions:

1. $SiO_2$=72.6±0.5 mol %, $B_2O_3$=13.4±0.5 mol %, $Al_2O_3$=6.5±0.4 mol %, $Li_2O$=6.9±0.4 mol %, and $ZrO_2$=0.5±0.1 mol %.
2. $SiO_2$=70.2±0.5 mol %, $B_2O_3$=20.4±0.5 mol %, $Al_2O_3$=3.4±0.4 mol %, $Li_2O$=1.4±0.2 mol %, $Na_2O$=2.3±0.2 mol %, $CaO$=1.1±0.2 mol % and F=1.1±0.2 mol %.
3. $SiO_2$=78.1±0.5 mol %, $B_2O_3$=20.4±0.5 mol %, $K_2O$=1.5±0.2 mol %.
4. $SiO_2$=78.0±0.5 mol %, $B_2O_3$=20.4±0.5 mol %, $K_2O$=0-1.0±0.2 mol % and $Na_2O$=0.8-1.6±0.2 mol %.
5. $SiO_2$=78.0±0.5 mol %, $B_2O_3$=20.4±0.5 mol %, $K_2O$=0.4±0.2 mol % and $Na_2O$=1.2±0.2 mol %; and
6. $SiO_2$=78.0±0.5 mol %, $B_2O_3$=20.4±0.5 mol %, $K_2O$=0 mol % and $Na_2O$=1.6±0.2 mol %.

The glass compositions according to the invention that are suitable for frit use have and have a crystallized depth layer, as measured by the HTS method described herein using bulk glass, of less than 30 μm as measured after sintering on frit bars, preferably less than 20 μm, and most preferable 10 μm or less. Further, the glass compositions according have a softening point less than 825° C., preferably less than 800° C., and CTE<35×10/° C.

DETAILED DESCRIPTION

A process for the manufacturing of microreactors can be based on micromolding of glass frit structures onto a substrate and then covering the frit with an appropriate cover layer of material. This process is based on the micromolding techniques disclosed in U.S. Pat. No. 5,853,446 (the '446 patent) that are used to make formed glass structures that are particularly useful for forming barrier rib structures for use in plasma display units.

Figure 2:
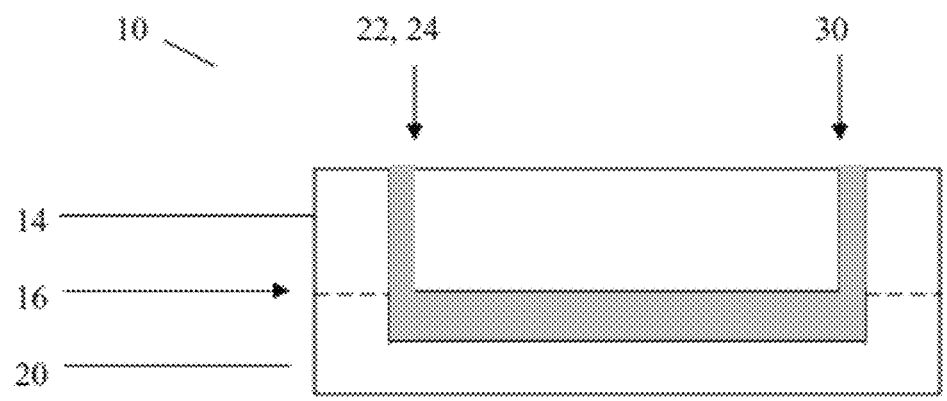
FIG. 2 is a side view of the microreactor of FIG. 1 that further illustrates the placement of a top plate over the substrate having the reactor structure etched therein.
Figure 4:
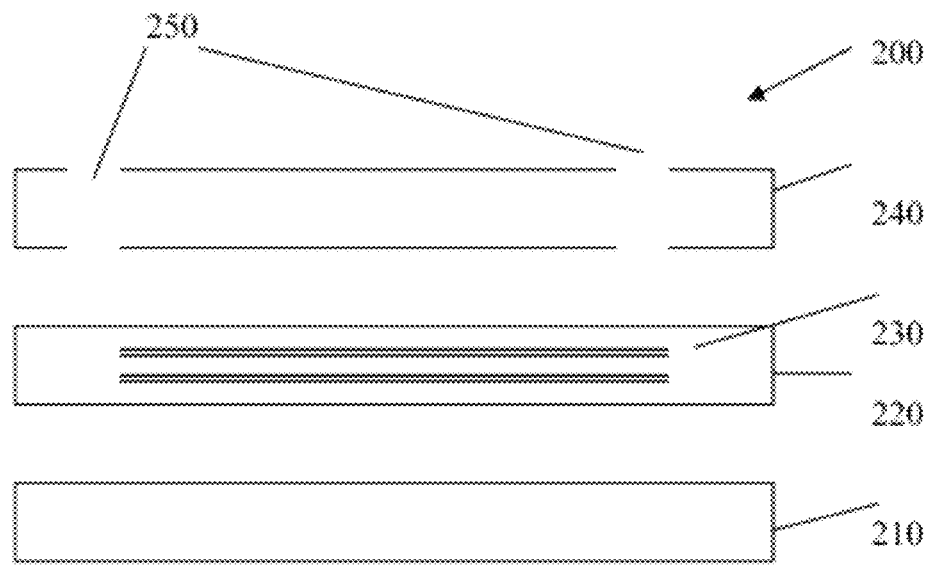
FIG. 4 is a side view of a microreactor illustrating a bottom substrate, a frit with the microreactor design therein as represented by the horizontal lines and a top substrate having at least openings for the entry and exit of fluids.

FIG. 2 of the '446 patent illustrates a frit bonded (adhered) to the substrate. To make a microreactor, two substrates (first or bottom and second or top substrates) would be used and the frit would be sandwiched between them as illustrated in FIG. 4 of this application.

One process for making a microreactor uses two firing steps to consolidate frit structures. The first firing step or heat treatment, called "pre-sintering", is made at a temperature at which the viscosity of the frit is approximately 1×10$^{10}$ poise and for a time in the range of 25-40 minutes to ensure initial densification of the fits glass composition. This first heat treatment is needed to achieve sufficient frit structure strength and to provide adequate adhesion of the frit layer to a substrate prior to any further processing or machining (for example: dicing, drilling, polishing, etching or other processing steps). Once the additional processing steps have been completed, a second firing or heat treatment step (also called the sintering or curing cycle) is needed to seal the stacked layers and the frit and the substrate together, complete full densification and achieve gas tightness of the frit structures. This final curing is made at a frit viscosity of approximately 1×10$^7$ poise for a time in the range 20-45 minutes.

Figure 1:
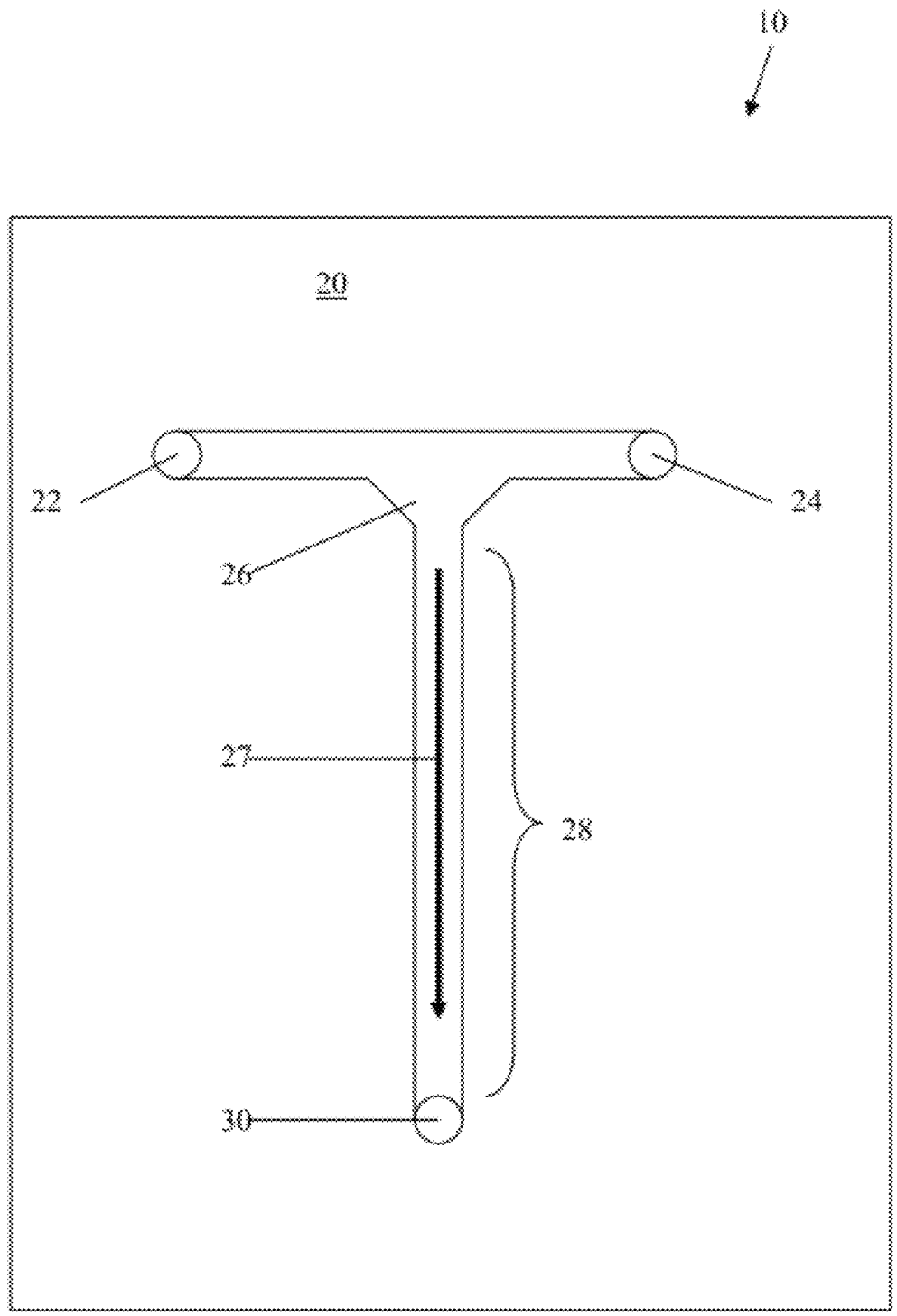
FIG. 1 is a top view of a microreactor having a T-shaped reaction structure microreactor that has been etched into a substrate.
Figure 3:
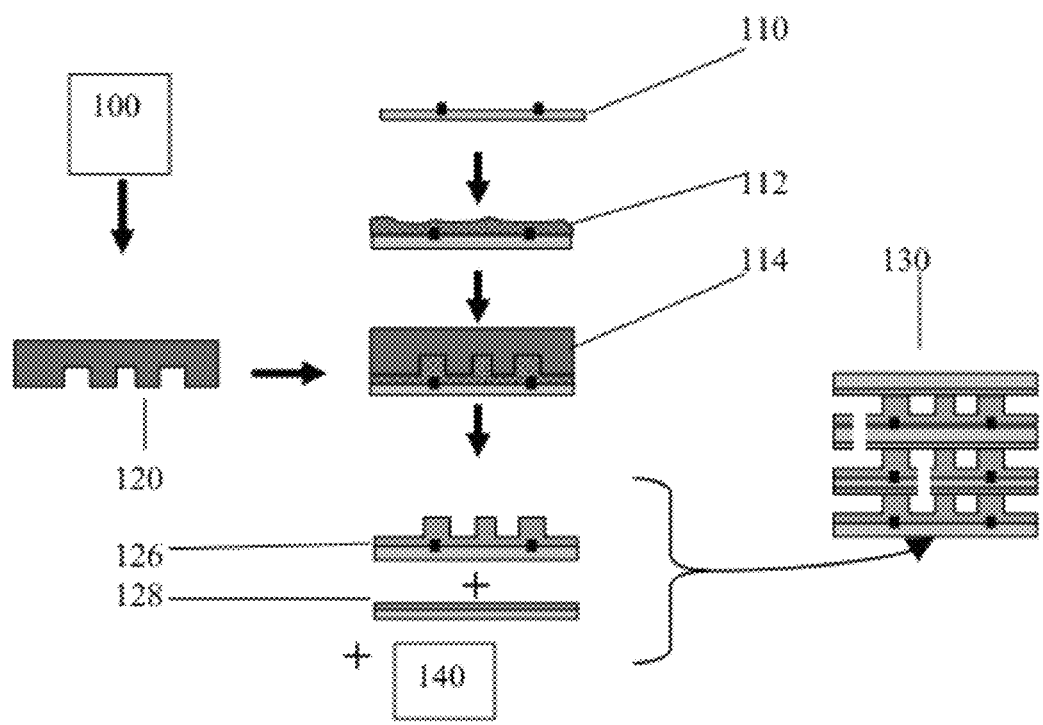
FIG. 3 illustrates a process for making a microreactor, in this illustration the microreactor being a multilevel complex design.

FIG. 3 illustrates, in a very general way, a molding process for making a microreactor, in this case a microreactor having a complex, multilayer design. Box 100 represents the mask design and production of the master mold which is used to make a production mold 120 out of a material such as a silicone. A suitable substrate 110 is selected and the frit composition 112 is placed on substrate 110. The mold 120 is then applied to the composition 114 on substrate 110 to form the frit design as indicated at 126; and after removal of the mold the composition is presintered as described above. A top substrate 128 is placed over the frit/substrate combination represented by 126 and appropriate openings are drilled as indicated by numeral 140. Several layers of fits can be combined and then cured together to form the finished microreactor 130. FIG. 4 represents a very simple microreactor such as the T-shaped microreactor illustrated in FIG. 1. The microreactor 200 is comprised of a bottom substrate 210, a molded fit 220 with the reactor design therein as represented by 230 and top substrate 240 that has openings 250 therethrough for the entry and exit of fluids. The substrate glasses are commercially available borosilicate and boroaluminosilicate glasses such as Corning 7740, 1737, 7761 and Eagle 2000 glasses, all of which are commercially available.

U.S. Patent Application Publication 2004/0152580, published Aug. 5, 2004 (the '580 application), commonly owned with this application by Corning Incorporated, describes borosilicate frits that are resistant to crystallization of polymorph silica crystals and also compatible with the microreactor process. However, these frits partially crystallized (approximately 5-10% stuffed beta quartz crystals) after the two-step firing process described above. The present invention relates to improved borosilicate frits having a coefficient of thermal expansion matched with a similar viscosity to glasses reported in the '580 publication, but has higher resistance to crystallization than the frit compositions described in the '580 publication. Frits of the present invention are made from glass compositions that have a crystallized depth layer, as measured by the HTS method described herein using bulk glass, of less than 30 μm as measured after sintering on frit bars, preferably less than 20 μm, and most preferable 10 μm or less.

In accordance with the invention, in making the microreactors it is preferred that the glass substrate be made of a low thermal expansion glass, preferably one having a thermal expansion in the range of 25 to $40\times10^7$/° C., preferably in the range of 30 to $40\times10^7$/° C. Accordingly, in accordance with the invention the material used to make the frit should be made of a low thermal expansion material; should also have a softening point temperature that does not exceed 850° C., and preferably less than 800° C., in order to prevent deformation (creeping) of the substrate 1737 or Eagle 2000 during firing; should have high crystallization resistance in order to insure full densification and good strength; and should have a high chemical resistance to acids and alkalis (the higher the better). The frit compositions according to the invention satisfy these criteria.

The borosilicate glass frits of the present invention have a base composition in mole percent (mol %) of:
$B_2O_3$=12-22 mol %
$SiO_2$=68-80 mol %; and as additional substances either:
(a) $Al_2O_3$=3-8 mol % and $Li_2O$=1-8 mol %, or
(b) $K_2O$=0-2 mol % and $Na_2O$=0-2 mol %, except that both $K_2O$ and $Na_2O$ cannot both equal zero at the same time.
In addition, one or more of calcium oxide (CaO) in an amount of 1.0-1.4 mol %, zirconium oxide $ZrO_2$) in an amount of 0.5±0.1 mol %, fluorine (F) in an amount less than 1.5 mol %, and sodium oxide ($Na_2O$) in an amount less than 3 mol % can optionally be added to the a glass of the base composition and (a) as above (the amounts of the other components being adjusted accordingly).

Borosilicate glasses and glass fits according to the invention can also have a composition in mole percent (mol %) of $B_2O_3$=18-22 mol %, $SiO_2$=75-80 mol %, $K_2O$=0-2 mol %, and $Na_2O$=0-2 mol %, except that both $K_2O$ and $Na_2O$ cannot both equal zero at the same time.

Examples of some of the preferred glass compositions for the 1737 substrate, and similar substrates known to those skilled in the art, are:
1. $SiO_2$=72.6±0.5 mol %, $B_2O_3$=13.4±0.5 mol %, $Al_2O_3$=6.5±0.4 mol %, $Li_2O$=6.9±0.4 mol %, and $ZrO_2$=0.5±0.1 mol %.
2. $SiO_2$=70.2±0.5 mol %, $B_2O_3$=20.4±0.5 mol %, $Al_2O_3$=3.4±0.4 mol %, $Li_2O$=1.4±0.2 mol %, $Na_2O$=2.3±0.2 mol %, CaO=1.1±0.2 mol % and F=1.1±0.2 mol %.
3. $SiO_2$=78.1±0.5 mol %, $B_2O_3$=20.4±0.5 mol %, $K_2O$=1.5±0.2 mol %.

Further, the glass compositions suitable for frit use have a crystallized layer depth, as measured on bulk glass using the HTS method described herein, of 30 μm or less, preferably 20 μm or less, and most preferably 10 μm or less.

Preferred glass compositions for the Eagle 2000 substrate, and similar substrates known to those skilled in the art, have a composition in mole percent (mol %) of $B_2O_3$=18-22 mol %, $SiO_2$=75-80 mol %, $K_2O$=0-2 mol %, and $Na_2O$=0-2 mol %, except that both $K_2O$ and $Na_2O$ cannot both equal zero at the same time. A preferred composition is:
4. $SiO_2$=78.0±0.5 mol %, $B_2O_3$=20.4±0.5 mol %, $K_2O$=0-1.0±0.2 mol % and $Na_2O$=0.8-1.6±0.2 mol %.

Especially preferred compositions are:
5. $SiO_2$=78.0±0.5 mol %, $B_2O_3$=20.4±0.5 mol %, $K_2O$=0.4±0.2 mol % and $Na_2O$=1.2±0.2 mol %; and
6. $SiO_2$=78.0±0.5 mol %, $B_2O_3$=20.4±0.5 mol %, $K_2O$=0 mol % and $Na_2O$=1.6±0.2 mol %.

The foregoing glass compositions suitable for frit use have, after heat treatment, a crystallized layer depth of 30 μm or less, preferably 20 μm or less, and most preferably 10 μm or less. The borosilicate glass compositions have a CTE in the range of $25\text{-}35\times10^{-7}$/° C.

Borosilicate glass powders described in the present invention were prepared from quartz, anhydrous boric oxide, boric acid, calcined alumina, alkali carbonates and, optionally, alkaline-earth carbonates. After mixing, the vitrifiable mixture was melted in an induction furnace at 1650° C. for 6 hours in a platinum-rhodium crucible. The melted glasses were then quenched in water and milled under dry conditions using an alumina ball mill. The ball-milled powder was then sieved (to <63 μm) and paste samples were prepared from the sieved powder mixed with wax material (for example, MX4462) by molding a flat layer onto a selected substrate; for example, a Corning 1737 or Eagle 2000 glass substrate. The samples were then heated (pre-sintered and sintered) according to the two-step process described above.

The crystalline phases present in samples were identified and analyzed by both xray diffraction ("XRD") and scanning electron microscope ("SEM") analysis. XRD helps to identify the nature and determine the amount of crystalline phase whereas SEM observations inform on dimensions, shapes and localization of the crystals among residual glass. In addition, a specific test designated "HTS" herein was used to evaluate the crystallization resistance of "bulk" glasses by heat treating a polished piece of glass (for example, a bulk glass obtained from the crucible melt described in the previous paragraph, or cored/sawed from a large boule) for forty-eight (48) hours at the glass' softening point temperature (typically corresponding to a viscosity in the range of $10^7$ to $10^8$ poise for the glasses described herein). The extent of crystallization was compared from one composition to another by measuring the thickness of the crystallized layer and the dimensions of the crystals. The lower the HTS value the greater the crystallization resistance of the glass. HTS values of 30 μm or less are preferred, with values less than 20 μm being especially preferred. A glass having a HTS value of approximately 10 μm or less is deemed to be totally amorphous when used in powder form after the two-step firing process. The polishing of the glass piece used for the HTS test was carried out using cerium oxide and standard glass polishing methods known in the art, for example, methods described or referenced in the *Handbook of Ceramic Grinding and Polishing*, eds. I. M. Marinescu et al (Park Ridge, N.J. USA, Noyes Publications 2000), pp. 374-389.

The thermal expansion of the fits was measured by thermal mechanical analysis ("TMA") or by dilatometry. Glasses according to the invention have a coefficient of thermal expansion (CTE), measured as bulk glass, in the range of $25\text{-}40 \times 10^{-7}/°$ C. The CTE value should be smaller than that of the substrate glass in order to avoid tensile stresses building up during use and fracturing the reactor. The glasses of the invention also have a softening point less than 800° C. As a general rule, the softening point of the frit glass should be less than that of the substrate. Consequently, some adjustment of the glass composition may be necessary if the substrate glass is changed. Seal stresses were examined via polarimetric techniques and mismatch as a function of temperature also recorded. Glass viscosity between $10^8$ to $10^{13}$ poise was measured by the fiber elongation method for bulk glasses. Chemical durability was determined by measuring the weight loss of samples immersed in acid or alkaline media in accordance with DIN 12116 (acid), and ISO 695 (alkali).

Figure 6:
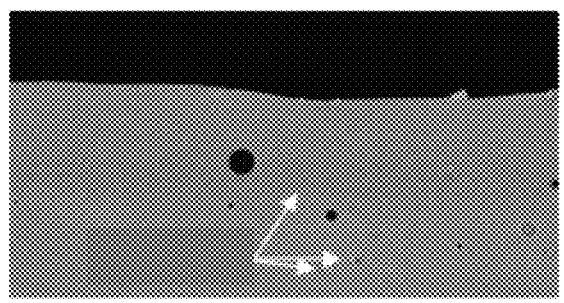
FIG. 6 is a microphotograph illustrating the crystals (as illustrated by the arrows) found in a composition containing fluorine and the oxides of sodium, lithium, aluminum, calcium, boron and silicon.

Alumina in a borosilicate glass composition inhibits, and may even prevent, the formation of polymorph silica crystals in alkali borosilicate frits. However, when a substantial quantity of alumina is added into the glass composition the softening point temperature of the glass, or a glass frit made with the composition, increases drastically. Consequently, in order to maintain a low softening point and to satisfy maximum processing temperature requirements, it is necessary to add flux components, or to increase the amount of the flux components if they are already present, to balance the alumina effect. Since a strong coupling occurs in glass networks between Li+ and Al3+, $Li_2O$ was selected as the flux material to soften the glass. A borosilicate glass composition designated in Table 1 as REAC 66 was found to have good crystallization resistance and very good chemical resistance. This glass composition contains $Al_2O_3$ and $Li_2O$. However, even if crystallization of polymorph silica crystals is actually inhibited by alumina, there is always a concern that when alumina and lithium are present together in a frit composition, a minor amount of stuffed β-quartz crystals will frequently still occur during sintering (see FIG. 6, Sample REAC 70).

Figure 5:
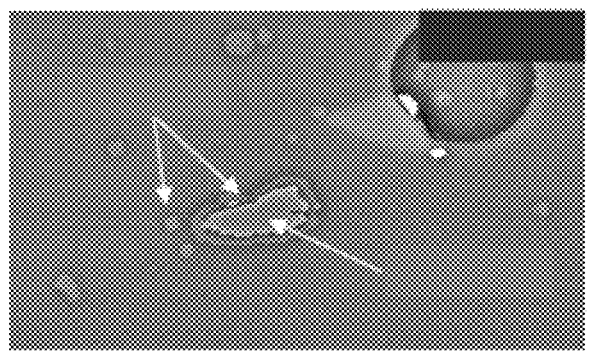
FIG. 5 is a microphotograph of a $B_2O_3/Al_2O_3/Li_2O/SiO_2$ glass frit illustrating that the frits according to the invention do not crystallize even when alumina particles (as illustrated by the arrows) are present as a result of steps such as cutting and grinding using alumina saws and grinding devices.
Figure 7:
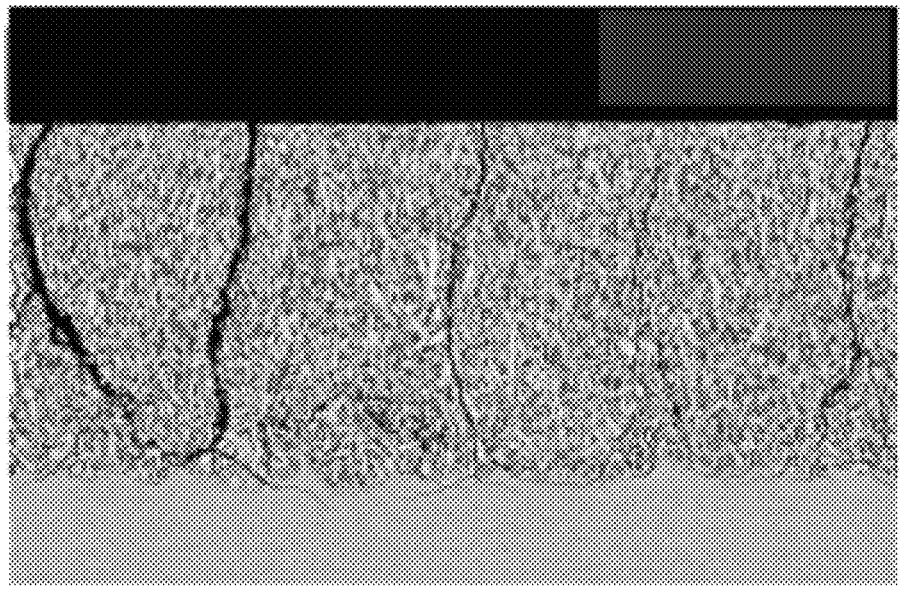
FIG. 7 is a microphotograph illustrating a composition not of the invention containing alumina and lithium that contains an amount of stuffed βquartz crystals after sintering.
Figure 8:
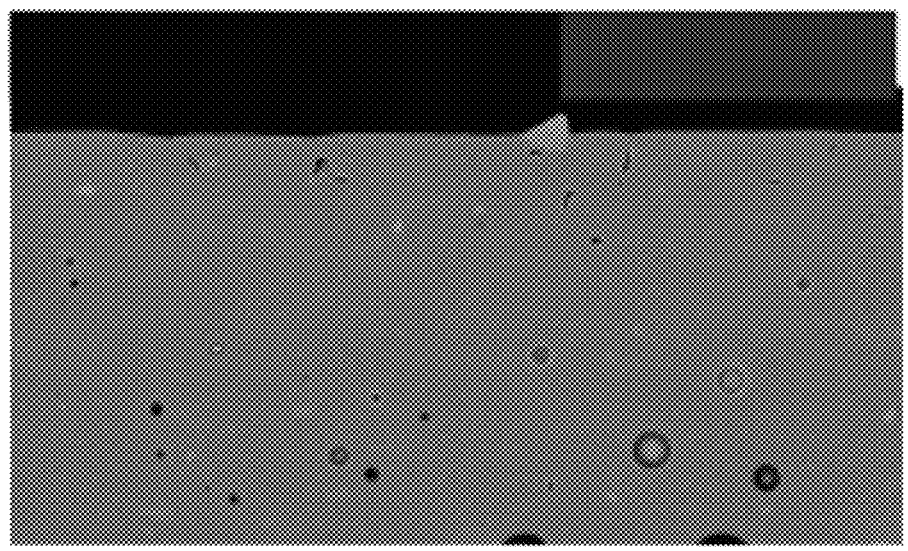
FIG. 8 is a microphotograph of a glass composition according to the invention that shows no crystallization after sintering.

The invention has resulted in new alkali borosilicate frits which are more resistant to crystallization than prior compositions. The sintered structures made with these frits remained totally amorphous after the two-firing step process. The new frits do not crystallize during sintering even if particles such as alumina particles (see FIG. 5) coming from grinding or others impurities are present into the paste before sintering. This great level of crystallization resistance is achieved by increasing the boron content of the glass frit composition. For example, the glasses designate BM 5 and 723 CWF bulk glass exhibit only a small amount of crystallization after the long duration heat treatment of the HTS test. For each of these samples a crystallized layer depth measured from the top surface is only 10 μm versus, for example, 226 μm for 7740 glass processed under similar conditions. [See FIG. 7 for a microphotograph of the crystallized layer for the 7740 glass. While the 7761 glass has a high crystallization resistance, it also has a high softening point which is undesirable for matching 1737 or Eagle 2000. Consequently, a lower softening point glass having the high crystallization resistance of the 7761 glass was discovered as disclosed herein. [As a result, the crystallization of the 7740 glass illustrated in FIG. 7 is avoided.] In addition, when a layer of glass frits made from the BM 5 or the 723 CWF compositions was sintered, the frit remained completely amorphous. No crystals (either cristobalite or stuffed quartz phase such as β-eucryptite) were observed as is shown in FIG. 8 for the 723 CFW composition. Thus, for these frits, both crystal families [silica polymorphs such as cristobalite, α-quartz, tridymite or stuffed β-quartz such as β-eucryptite] are inhibited by boron. In addition, the study has confirmed that alkalies enhance cristobalite tendency to crystallize and that low alkali content will further eliminate crystallization. As an example of the need for boron to reduce the tendency to crystallize compare compositions BM 3, BM 4 and BM 5 in Table 2. Sample BM 5 has an analyzed $K_2O$ content of 1.5 mol % and a crystallized depth of 10 μm. In contrast, BM 3 and BM 4 have analyzed $K_2O$ contents of 3.5 and 4.2 mol %, respectively, and crystallized depths of 38 and 70 μm, respectively. The comparison illustrates the tendency for a crystallized layer to form with increasing alkali content when an inhibitor such as boron is not included.

The glass compositions according to the invention have very good level of acid resistance, their acid resistance as determined by DIN 12116 (see Tables 1 and 2) being similar to 7740 glass which is a Pyrex® glass used to make laboratory glassware (see values for BM 5 and BM 7). However, by increasing boron content above 13% (mol), there is some lowering of the alkali resistance (ISO 695 values in Tables 1 and 2)) of the glasses. Values for alkali tests increase from 102 mg/dm2 (7740 glass) to values of 374 and 1220 for the BM 5 and 723 CWF compositions, respectively.

Figure 9:
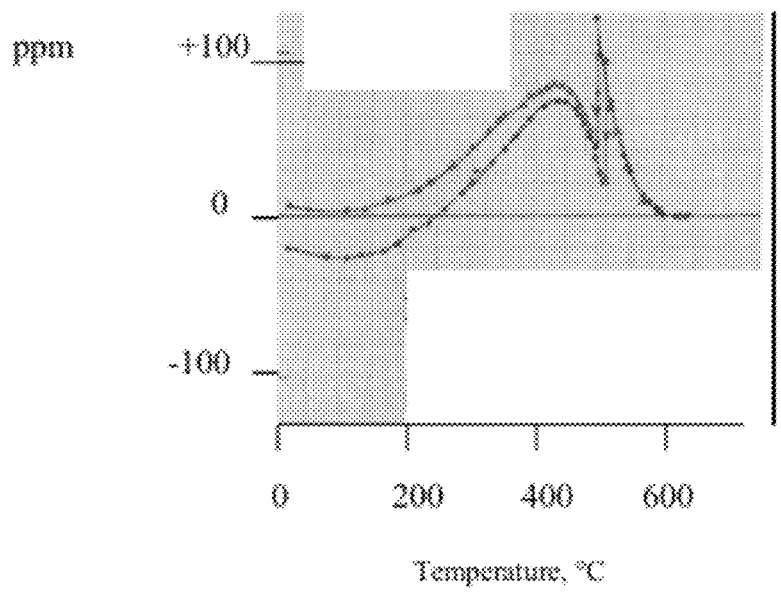
FIG. 9 is an illustration of the thermal expansion dynamic mismatch curves for composition 723 CWF frit layers in slight tension or compression.

Regarding mismatch for a frit coating applied to a substrate, the magnitude and sign of seal stress can be managed over a large temperature range by adjusting the thermal cycle on cooling step that occurs after the final assembly. For example, on code 1737 glass substrate, all frit layers of 723 CWF are typically in slight tension after cooling as shown in thermal expansion dynamic mismatch curves (see FIG. 9). It is also possible to design a cooling schedule containing an annealing hold period which will place the 723 CWF frit into mild compression. This imparts a real advantage to the compositions of the invention because one can reach compression or tension for the frit structures with a single composition.

The glass compositions according to the invention impart an advantage over previously known borosilicate glass frits by providing new families of borosilicate frits that have similar properties of thermal expansion, chemical stability and viscosity as Pyrex® 7740 or 7761 frit glasses, and additionally have a very strong crystallization resistance not found in glass frits made from 7740 glass. The new frits according to the invention did not crystallize during the two-firing steps as used in conducting the experiments reported herein in spite of the presence of impurities that may be present in the paste. The glass frit compositions according to the invention can form hermetic sintered channels on glass substrates in accordance with the process described in U.S. Pat. No. 5,853,446 (3). The microreactor channels formed in the frits are vitreous, translucent, chemically durable and resistant to thermal shock. The frits can also be matched to different substrate materials, for example a 1737 or Eagle 2000 substrate, over a large temperature range (300° C.), and the sign and magnitude of mismatch can be tailored by the thermal cycle.

Tables 1 and 2 describe a number of glass compositions that were prepared and evaluated for use as frits. Compositions REAC 66, 720 CWF and BM 5 were found to most closely match frit requirement for substrates made of 1737 glass which is commercially available from Corning Incorporated. Other glass compositions that can be used are the REAC 70 and REAC 82 which have a crystalline layer less than 20 µm. All glass composition according to the invention have a CTE close matched to substrate CTE values and also have softening points that are below that of the substrate and are below 825° C. to ensure that the glass can be properly sealed to the substrate without requiring high temperatures that may induce the composition to form crystals or deform the substrate. All compositions shown in Tables 1 and 2 are by analysis of a specific batch and can vary from batch to batch. The preferred compositions REAC 66, 723 CWF and BM 5 have values that fall within the ranges given above.

TABLE 1

| % mol | 7740 | REAC 66 | REAC 70 | REAC 82 | 723 CWF | 720 CWF |
|---|---|---|---|---|---|---|
| $SiO_2$ | 83.3 | 72.6 | 73 | 73.8 | 70.2 | 69.7 |
| $B_2O_3$ | 11.5 | 13.4 | 13.4 | 15.5 | 20.4 | 20.8 |
| $Al_2O_3$ | 1.2 | 6.5 | 6.1 | 4.9 | 3.4 | 3.4 |
| $Li_2O$ | | 6.9 | 6.8 | 4.2 | 1.4 | 1.4 |
| $Na_2O$ | 4 | | | 1.6 | 2.3 | 2.3 |
| ZnO | | | 0.8 | | | |
| CaO | | | | | 1.1 | 1.1 |
| $ZrO_2$ | | 0.5 | | | | |
| F | | | | | 1.3 | 1.3 |
| Bulk glass CTE ($10^{-7}$/° C.) | 32.5 | 33.6 | 36.4 | 35.3 | 34.8 | 36.7 |
| Softening point (° C.) | 825 | 819 | 780 | 779 | 757 | 734 |
| HTS: crystalline phases (XRD) | crist. | amorph. | B-quartz | B-quartz | amorph. | B-quartz crist. |
| HTS: crystallized layer depth (µm) | 226 | | 10 | 10 | | nm |
| DIN 12116 (mg/dm2) | <0.1 | 4.8 | 9.2 | 8.4 | 50 | |
| ISO 695 (mg/dm2) | 102 | 112 | 222 | 239 | 1220 | | crist. = cristobalite
amorph. = amorphous
1737 is a Corning Pyrex ® glass formulation with excellent acid and alkali resistance

TABLE 2

| % mol | 7761 | BM 3 | BM 4 | BM 5 | BM 6 | BM 7 |
|---|---|---|---|---|---|---|
| $SiO_2$ | 82.1 | 79.9 | 79.2 | 78.1 | 76.4 | 74.5 |
| $B_2O_3$ | 16.4 | 16.6 | 16.7 | 20.4 | 22.1 | 23.9 |
| $K_2O$ | 1.5 | 3.5 | 4.2 | 1.5 | 1.5 | 1.5 |
| Bulk glass CTE ($\times 10^{-7}$/° C.) | 26.8 | 31.7 | 37.4 | 30 | 31.6 | 32.3 |
| Softening point (° C.) | 842 | 788 | 782 | 783 | 764 | 758 |
| HTS: crystalline phase (XRD) | crist. | crist. | crist. | crist. | crist. | crist. |
| HTS: crystallized depth (µm) | layer not measured | 38 | 70 | 10 | not measured | not measured |
| DIN 12116 (mg/dm2) | 0.15 | | | <0.1 | | 0.7 |
| ISO 695 (mg/dm2) | 376 | | | 374 | | 568 | crist. = cristobalite
amorph = amorphous
7761 is a Corning Pyrex ® glass formulation with excellent acid and alkali resistance.

A preferred substrate for microreactor devices is Corning's commercially available Eagle 2000 glass. Because the glass frits defining the microreactor structure seal directly to the substrate, CTE compatibility between the substrate and the frit is a major concern. The CTE of the Eagle 2000 glass is in the range of $30-32 \times 10^{-7}$/° C. While, as indicated above in Experiment 1, the 7761 and 7740 glasses could be used as frit materials, they are not ideal for the Eagle 2000 substrate because either the softening point is too high or because they fail the crystallization test. Ideally, the softening point should be less than 800° C., preferable less than approximately 780° C., and the crystallized layer should be less than 30 µm and preferably 10 µm or less. The BM 5 glass shown above in Table 2 meets both these criteria. As a result, a series of experiments was performed to optimize the BM 5 composition for use with the Eagle 2000 substrate. This was carried out by replacing $K_2O$ with $Na_2O$ in the composition. Table 3 gives the results of these experiments. BM 5-721UP is the same composition as BM 5 in Table 2.

TABLE 3

EFFECT OF REPLACING K WITH NA IN BM-5 GLASS

| (mole %) | BM 5-721UP | BM 5-721 UQ | BM 5-721 UR | BM 5-721US | BM 5-721UT |
|---|---|---|---|---|---|
| $SiO_2$ | 78.0 | 78.0 | 78.0 | 78.0 | 78.0 |
| $B_2O_3$ | 20.4 | 20.4 | 20.4 | 20.4 | 20.4 |
| $K_2O$ | 1.6 | 1.2 | 0.8 | 0.4 | — |
| $Na_2O$ | — | 0.4 | 0.8 | 1.2 | 1.6 |
| Bulk glass CTE ($10^{-7}$/° C.) | 32.3 | 30.1 | 28.9 | 28.6 | 27.0 |
| RT mismatch, 1737 butt seal sintered at 800°/1 hr (ppm) | −41 | −56 | −70 | −92 | −104 |
| Softening pt | 783 | | | | 772° |
| HTS crystallization layer depth (µm) | 10 | | | | 10 |
| DIN 12116 | <0.1 | | | | <0.1 |
| ISO 695 | 374 | | | | 342 |

*DIN 12116—6 hr. boiling in 6N HCl
**ISO 695—3 hr. boiling in 1N NaOH/$Na_2CO_3$
Missing values for BM 5 712UQ, -721UR and -721US are the same as or transitional between the values for BM 5 721UP and BM 5 721UT To evaluate the expansion compatibility between frit candidates and Eagle 2000 glass, extensive use was made of photoelastic measurements to evaluate residual and transient strains arising from CTE mismatch. Model seals of frit and the Eagle 2000 substrate were prepared and evaluated. These seals were typically butt seals where the frit was applied to one surface of the substrate (typically, a 10×10×20 mm substrate) to mimic a microreactor. The seal was prepared using a paste of amyl acetate and nitrocellulose as the vehicle/binder system, and then fired in a furnace on the desired presintering and sintering schedules used for microreactor fabrication as is described above. Following firing, the residual mismatch in the frit was measured at room temperature. Alternatively, an already-fired specimen was heated to a temperature at which all stresses were relieved, and then transient mismatch was measured in the seal as it was cooled down. Both room temperature and transient mismatch values were obtained with a polarimeter to measure optical retardation. The photoelastic measurements were used to calculate the total expansion mismatch, $^{TM}_{T}$, between the substrate glass and the frit according to the equation:

$$\delta_T = \Delta T(\alpha_g - \alpha_f)$$

where $\alpha_g$ and $\alpha_f$ are expansion coefficients of glass and frit, respectively, and $\Delta T$ is temperature range of interest. References with regard to the calculations are: [1] H. E. Hagy, "A Review and Recent Developments of Photoelastic Techniques for the Measurement of Thermal Expansion Differentials using Glass Seals," Proceeding of the Thirteenth International Thermal Expansion Symposium, Technomic Publishing Co., pp. 279-290 (1999); and [2] ASTM Designation F140-98, "Standard Practice for Making Reference Glass-Metal Butt Seals and Testing for Expansion Characteristics by Polarimetric Methods," Annual Book of ASTM Standards 2002, vol. 15.02, pp. 514-519. (Note: Although this ASTM practice is written for glass-metal seals, it is perfectly adaptable for frit-glass seals).

Figure 10:
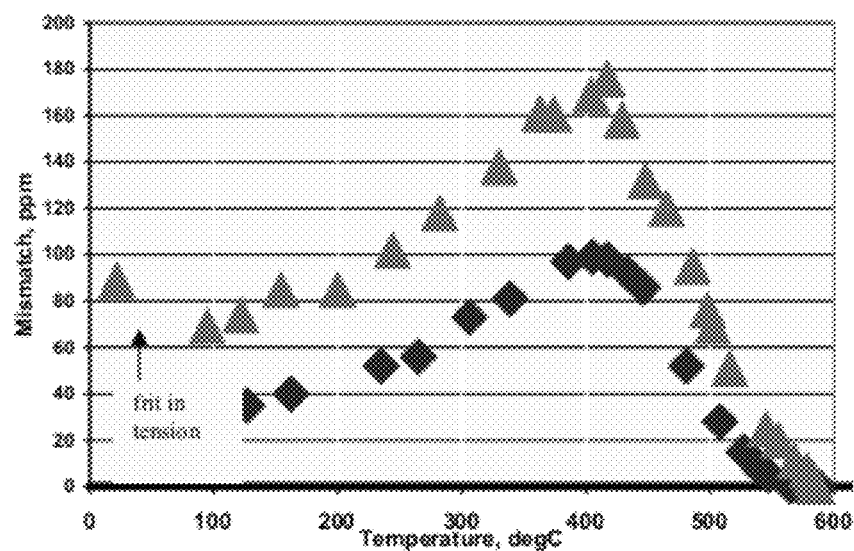
FIG. 10 illustrates of the mismatch in the butt seal using a BM 5 composition frit and Eagle 2000 substrate following 680° C. presintering and 800° C.

FIG. 10 shows expansion mismatch data obtained on a butt seal sample of BM-5 frit (melted as 721UJ), and Eagle 2000 glass. The butt seal sample was first fired to 680° C. for presintering, re-heated in a different furnace (one equipped with a polarimeter) to approximately 580° C. to relieve all mismatch strains, and then cooled slowly to monitor the re-appearance of the mismatch strains. Following this, the sample was then heated to 800° C. for sintering, and then re-heated in the polarimeter furnace as per the above procedure, so that mismatch strains corresponding to the sintering schedule could be measured during cooling. After each run in the polarimeter furnace, room temperature mismatch measurements were taken to assure that the residual strain after the presintering or sintering schedule was restored following the thermal cycle in the polarimeter furnace. The mismatch values shown in FIG. 10 (in ppm) correspond to those in the substrate glass at the frit-substrate interface. As such, mismatch values >0 (i.e., positive) denote that the frit is in undesirable tension. (Note that the frit is in tension following both the presintering and sintering schedules). In addition, transient values for the frit measured during the sintering schedule approach 180 ppm, a high strain state, and one not desired for a seal involving brittle materials. Preferred glass composition have mismatch values less than −20 (that is, are more negative than −20), and preferably less than −50.

It is apparent from FIG. 10, that BM-5, despite its good expansion compatibility with 1737 seen in Table 2, does not have the best expansion-match to the lower CTE substrate, Eagle 2000. As may be seen in Table 2, BM-5 is a potassium borosilicate glass. Typically, replacement of modifying cations such as potassium in a silicate glass by species of smaller size (but with the same charge) results in a lower CTE, since the higher field strength of the substituting ions produce an overall tightening of the silica tetrahedral framework. Shown in Table 3 above are data pertaining to the progressive molar replacement of $K^{+1}$ by $Na^{+1}$ for 721UP, the starting glass with composition essentially that of BM-5 described in Table 2 (the difference is 0.1 mol for both $K_2O$ and $B_2O_3$). It should be noted that progressive replacement of K by Na (while maintaining the same B:Si ratio) resulted in a continual decrease in CTE. This is also suggested by the RT mismatch data for butt seals.

Figure 11:
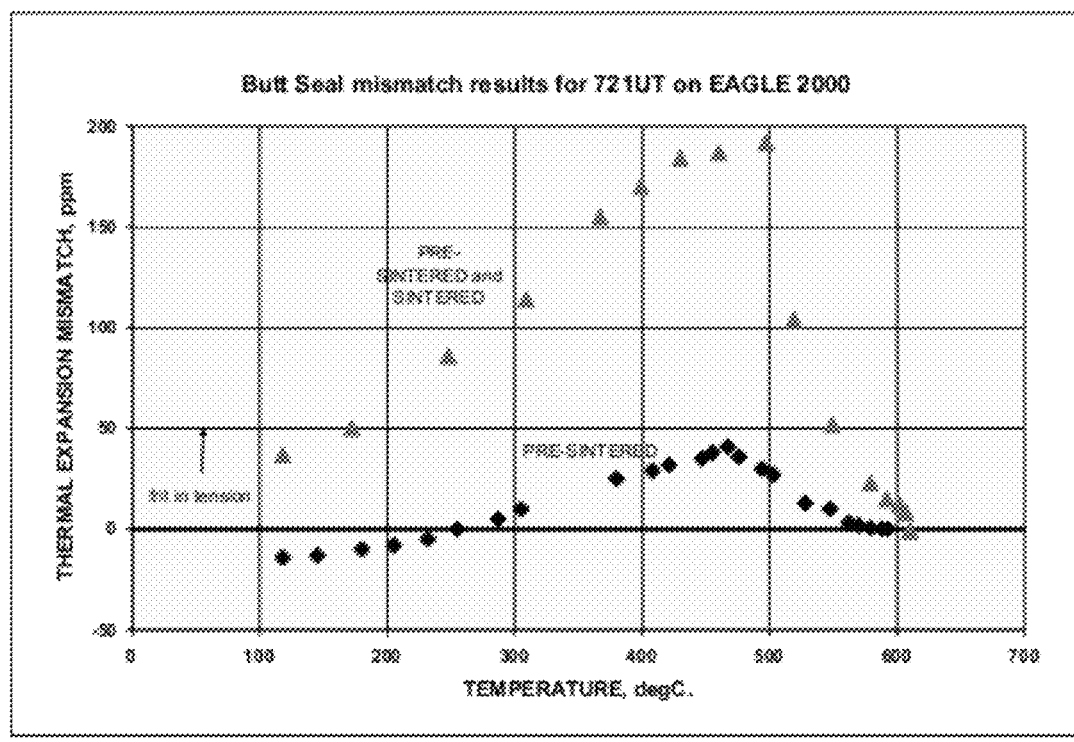
FIG. 11 illustrates butt seal mismatch for composition BM 5-721UP on Eagle 2000 substrate.

To determine the expansion compatibility of 721UT with Eagle 2000 glass, butt seals were prepared, fired on presintering (680° C.) or presintering (680°) and sintering (800° C.) schedules, re-heated in the polarimeter furnace to a temperature at which stress was relieved, and then cooled to collect retardation/mismatch data. These data are shown in FIG. 11. The improved mismatch of 721UT with Eagle 2000 is compared to that of BM-5 (FIG. 10). After presintering, 721UT is in mild compression, unlike BM-5 which was in tension. Following presintering and sintering, 721UT is in very mild tension (approx. +30 ppm) versus BM-5 which is in moderate tension (+90 ppm). As seen in Table 3, 721UT also possesses the appropriate softening point needed for firing microreactor structures, as well as exhibits excellent crystallization and corrosion resistance.

Although the mismatch strain levels in 721UT on Eagle 2000 are acceptable, the possibility of achieving additional reductions was explored using several different techniques such as: (a) annealing after 800° C. sintering hold; (b) addition of a filler to lower CTE; and (c) composition iterations around 721UT.

Figure 12:
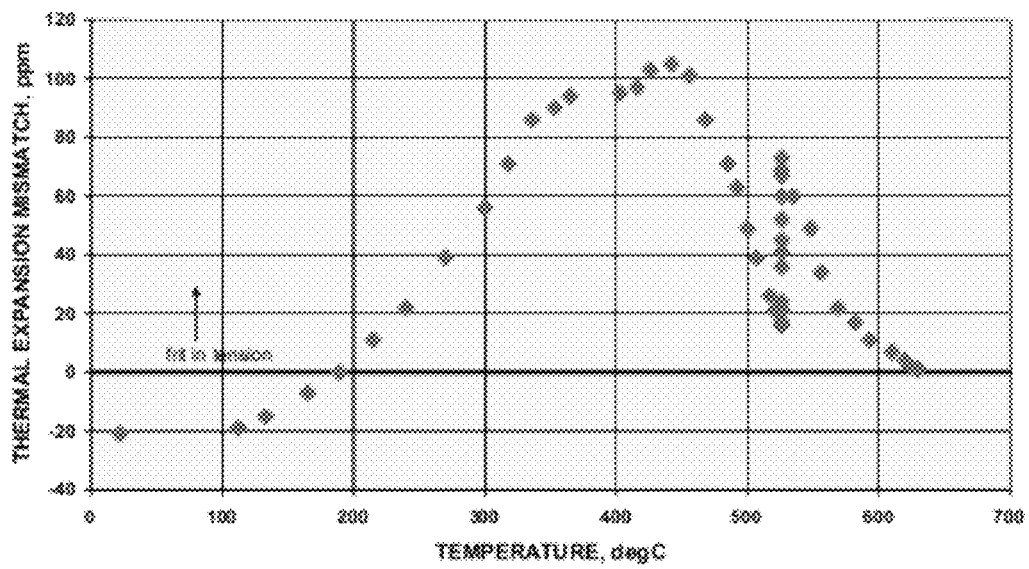
FIG. 12 illustrates butt seal mismatch for composition BM 5-721UP on Eagle 2000 substrate, presintered and sintered cooling data with 1 hour 38 minute hold at 526° C. and a cooling rate of 4° C./minute.
Figure 13:
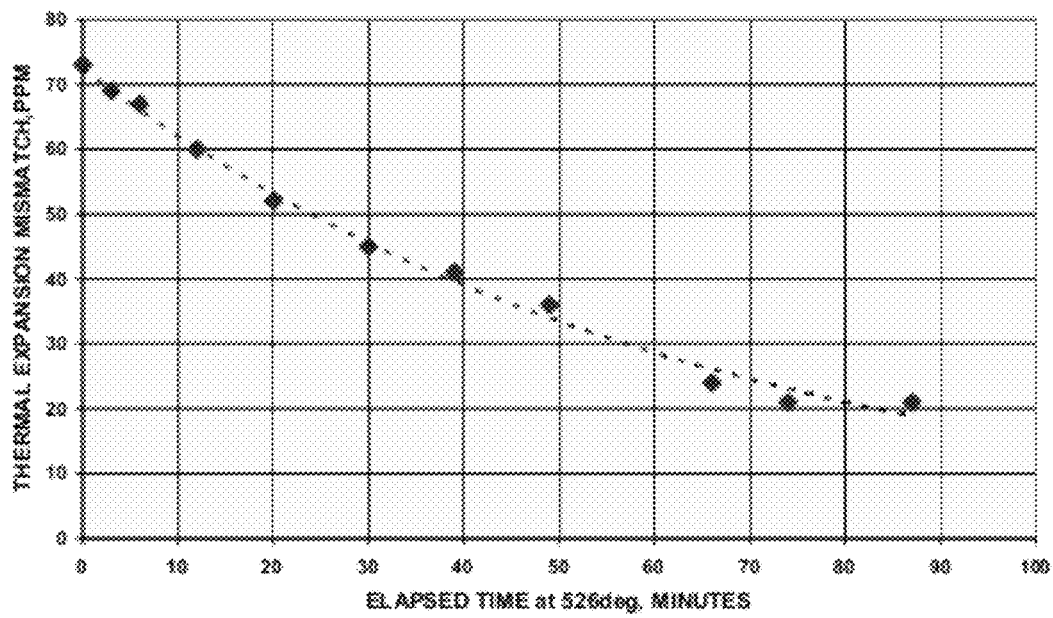
FIG. 13 illustrates thermal expansion mismatch versus time for a BM 5-721UP frit on Eagle 2000 substrate (presintered and sintered) during a hold at 526° C.

The effect after annealing after 800° C. sintering hold is illustrated in FIG. 12 by the mismatch readings for a 721UT-Eagle 2000 butt seal that was held at 526° C. during the cool-down from the 800° C. sintering hold. Note that, in comparison to FIG. 10 the maximum value of transient strain during cooling was reduced by approximately half (from +200 ppm to +100 ppm), and that the residual (or room temperature) mismatch now shows the frit in desirable compression. The actual relief of the mismatch strains during the annealing hold at 526° C. is shown in FIG. 13 for the 721UT-Eagle 2000 butt seal. Note that mismatch strain follows a classic Maxwell-type decay relationship.

The effect of fillers is to adjust the CTE of the frit to achieve a more acceptable mismatch. We have found that most of the fillers that have been used to lower CTE of the resulting frit mixture (termed "a blend") have been low CTE compounds obtained through the glass ceramic process. Examples, without limitation, of the materials that can be used as fillers include:

(1) ®-Eucryptite—a lithia-alumino-silicate composition, with intrinsic CTE=−10×10$^{-7}$/° C.;
(2) Stuffed ®-Quartz—a lithia-alumino-silicate composition, with Zn and/or Mg partially replacing some of the Li; with intrinsic CTE=0×10$^{-7}$/° C.; and
(3) ®-Spodumene—a lithia-alumino-silicate composition, with Zn and/or Mg partially replacing some of the Li; with intrinsic CTE=+10×10$^{-7}$/° C.

Figure 14:
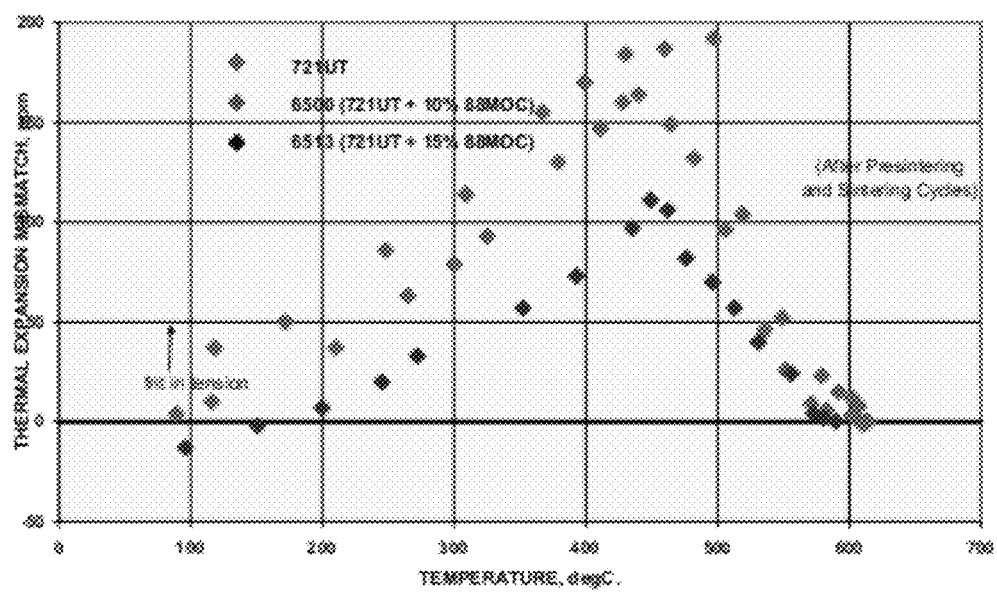
FIG. 14 illustrates butt seal mismatch for BM 5-721UP, Blend 6500 and Blend 6513 frits on Eagle 2000 substrate after presintering and sintering.

FIG. 14 illustrates the mismatch data for butt seals to Eagle 2000 following the 800° C. sintering schedule. Shown are 721UT (from FIG. 10), and two blends made with BM 5721UT (simply numbered as 721UT below and in FIG. 14) and stuffed Zn-containing ®Quartz designated 88MOC. These blends are identified as Blend 6500 (90% 721UT+10% 88MOC, wt. basis), and Blend 6513 (15% 88MOC or 85% 721UT+15% 88MOC). Note the progressive improvement of mismatch (i.e., frit becomes progressively in lower tension) with increasing filler addition. Also, it is to be understood that the presence of any of the foregoing fillers in the composition is not to be considered as impacting HTS crystallization depth layer and must be excluded from any determination of the HTS crystallization depth layer.

The invention can be further considered as being directed to a microreactor having at least the elements of a first substrate, a second substrate and a microreactor frit between the two substrates; where at least one of the top and bottom substrates has an entry opening and/or an exit opening for the entry and exit of the reaction fluids that are passed through the microreactor, and the frit has at least one channel, passageway or path from the entry opening to the exit opening, the frit being made of any glass composition recited herein. Optionally, the microreactor can also have baffles for mixing, heating elements with leads passing through the frit of a substrate, addition openings for the entry of additional substance to the reaction fluids while they travel from the entry opening to the exit opening, sensors with leads, sample ports and other elements such as are known in the art for monitoring, sampling, heating, and cooling. The microreactor can contain a single frit or a plurality of microreactor fits as has been described herein and is illustrated in exemplary manner in FIG. 3. Preferred glass compositions include:

1. $SiO_2$=72.6±0.5 mol %, $B_2O_3$=13.4±0.5 mol %, $Al_2O_3$=6.5±0.4 mol %, $Li_2O$=6.9±0.4 mol %, and $ZrO_2$=0.5±0.1 mol %.
2. $SiO_2$=70.2±0.5 mol %, $B_2O_3$=20.4±0.5 mol %, $Al_2O_3$=3.4±0.4 mol %, $Li_2O$=1.4±0.2 mol %, $Na_2O$=2.3±0.2 mol %, $CaO$=1.1±0.2 mol % and F=1.1±0.2 mol %.
3. $SiO_2$=78.1±0.5 mol %, $B_2O_3$=20.4±0.5 mol %, $K_2O$=1.5±0.2 mol %.
4. $SiO_2$=78.0±0.5 mol %, $B_2O_3$=20.4±0.5 mol %, $K_2O$=0-1.0±0.2 mol % and $Na_2O$=0.8-1.6±0.2 mol %.
5. $SiO_2$=78.0±0.5 mol %, $B_2O_3$=20.4±0.5 mol %, $K_2O$=0.4±0.2 mol % and $Na_2O$=1.2±0.2 mol %; and
6. $SiO_2$=78.0±0.5 mol %, $B_2O_3$=20.4±0.5 mol %, $K_2O$=0 mol % and $Na_2O$=1.6±0.2 mol %.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A borosilicate glass composition suitable for manufacturing microreactor glass frits, said borosilicate glass composition comprising in mole percent (mol %):
   12-22 mol % $B_2O_3$,
   68-80 mol % $SiO_2$,
   3-8 mol % $Al_2O_3$,
   1-8 mol % $Li_2O$, and
   1.1±0.5 mol % F,
   wherein after sintering a glass frit having said borosilicate glass composition, the glass frit has a surface crystalline layer of 30 µm or less or is amorphous throughout.

2. The borosilicate glass composition of claim 1, further comprising less than 3 mol % $Na_2O$.

3. The borosilicate glass composition of claim 1, further comprising 1.1±0.5 mol % CaO.

4. The borosilicate glass composition of claim 1, further comprising 1.1±0.5 mol % CaO and less than 3 mol % $Na_2O$.

5. The borosilicate glass composition of claim 4, which consists essentially of:
   20.4±1.6 mol % $B_2O_3$,
   70.2±2 mol % $SiO_2$,
   3.4±1 mol % $Al_2O_3$,
   1.0±2.2 mol % $Li_2O$,
   2.3±0.5 mol % $Na_2O$,
   1.1±0.5 mol % CaO, and
   1.1±0.5 mol % F.

6. The borosilicate glass composition of claim 4, which consists essentially of:
   20.4±0.5 mol % $B_2O_3$,
   70.2±0.5 mol % $SiO_2$,
   3.4±0.4 mol % $Al_2O_3$,
   1.4±0.2 mol % $Li_2O$,
   2.3±0.2 mol % $Na_2O$,
   1.1±0.2 mol % CaO, and
   1.1±0.2 mol % F.

* * * * *